United States Patent
Chrappan Soldavini et al.

(10) Patent No.: US 6,940,685 B2
(45) Date of Patent: Sep. 6, 2005

(54) VOLTAGE-MODE DRIVE FOR DRIVING COMPLEX IMPEDANCE LOADS

(75) Inventors: Francesco Chrappan Soldavini, San Donato Milanese (IT); Roberto Oboe, Vicenza (IT); Paolo Capretta, Valdobbiadene (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 120 days.

(21) Appl. No.: 10/464,435

(22) Filed: Jun. 16, 2003

(65) Prior Publication Data

US 2004/0036999 A1 Feb. 26, 2004

(30) Foreign Application Priority Data

Jun. 14, 2002 (EP) .............................. 02425387
Mar. 14, 2003 (EP) .............................. 03425158

(51) Int. Cl.[7] .................. G11B 5/596; G11B 21/02; G05B 11/01; H02P 5/00
(52) U.S. Cl. .................. 360/78.06; 360/75; 360/78.04; 318/560; 318/254; 388/800
(58) Field of Search ..................... 360/75, 32, 69, 360/78.04, 78.09, 78.06, 78.11; 318/560, 254, 461, 439, 599; 388/800, 804, 842

(56) References Cited

U.S. PATENT DOCUMENTS

| 5,859,512 A | 1/1999 | Büthker | 318/254 |
|---|---|---|---|
| 5,898,283 A | 4/1999 | Bennett | 318/254 |
| 6,285,146 B1 | 9/2001 | Harlan | 318/254 |
| 6,448,726 B1 | 9/2002 | Lukenich et al. | 318/254 |
| 2002/0180392 A1 * | 12/2002 | Hill | 318/560 |

FOREIGN PATENT DOCUMENTS

EP  0 822 649 A1  2/1998

* cited by examiner

Primary Examiner—Andrew L. Sniezek
(74) Attorney, Agent, or Firm—Lisa K. Jorgenson; Robert Iannucci; Seed IP Law Group PLLC (57) ABSTRACT

A method of driving an electrical load having a complex electrical impedance, such as a voice-coil motor controlling the position of a read/write head in a data storage disk drive system, comprises providing a voltage-mode driver generating drive signals for the electrical load in response to drive commands. Compensated commands for the voltage-mode driver are generated filtering the drive commands, compensating for a phase shift between electrical quantities delivered to the electrical load. The voltage-mode drive thus emulates a conventional, but more expensive, current-mode drive. In a preferred embodiment, the method comprises estimating characteristic parameters of the electrical load during the operation, and adapting the filtering to the estimated characteristic parameters. The estimation comprises implementing a Kalman filtering algorithm, particularly an extended Kalman filtering.

34 Claims, 3 Drawing Sheets

VOLTAGE-MODE DRIVE FOR DRIVING COMPLEX IMPEDANCE LOADS

BACKGROUND OF THE INVENTION

1. Field of the Invention

The present invention generally relates to driver circuits, and, more particularly to voltage-mode driver circuits. Even more particularly, the invention concerns a voltage-mode driver circuit adapted for driving complex impedance loads, i.e., loads having a transfer (admittance) function with one or more poles or zeros, such that the load current does not continuously reflect the applied voltage.

2. Description of the Related Art

An example of a complex impedance load is a motor, which is an inductive load. Motors are used in a wide variety of applications.

For example, in modern high-density disk drive storage systems, such as hard disk drives (HDDs), a voice coil motor (VCM) controls the position of a read/write head with respect to a disk surface. The VCM is inserted in a closed control loop. Exploiting data recorded at various locations on the disk surface (such as track numbers univocally identifying each recording track, and sinusoidal burst signals staggered in position between adjacent tracks), information about the head position is obtained, and a head position error signal is calculated and fed to an electromechanical servo position system.

The servo position system includes a current-mode driver, controlled by a servo positioning system controller, which delivers a controlled current to the VCM. The current-mode driver comprises a high-power linear amplifier and a shunt resistor for measuring the actual current delivered to the VCM. The difference between the measured current and a reference current provided by the servo controller is amplified by the linear amplifier.

The control loop has a relatively large closed-loop bandwidth, typically of 50 KHz; this allows designing the servo controller without having to take into account the dynamics of the current-mode driver: roughly speaking, the designer of the servo controller can consider a static transfer function between the reference current and the actual current delivered to the VCM.

Current-mode drivers for driving VCMs have proven to be very reliable and to enable quite precise a control of the read/write head position, even in modern high-density hard disk drives. In particular, an advantage of using a current-mode driver is that the current flowing through the VCM does not depend on the VCM electrical impedance, nor on the electro-motive force generated by the rotational speed.

However, current-mode drivers are rather costly, both in terms of dissipated power and in terms of components cost. The power dissipated is high due to both the linear amplifier and the shunt resistor. Linear power amplifiers require a large silicon die area, and additional components, such as the shunt resistor, are required.

In order to drastically reduce the costs, the measurement of the current delivered to the VCM should be dispensed with. This means eliminating the current control loop.

An apparently readily available solution to the problem is replacing the current-mode driver with a voltage-mode driver. However, this solution has not been pursued so far, mainly because, differently from the current-mode driver, the performance of a voltage-mode driver is heavily affected by the VCM dynamics. This would require completely redesigning the servo controller, something which makes manufacturers of disk drive systems very reluctant.

BRIEF SUMMARY OF THE INVENTION

An embodiment of the present invention provides a voltage-mode driver circuit adapted to be used for precisely driving complex impedance loads, such as VCMs of hard disk drives, and that can readily substitute for common current-mode drivers.

Summarizing, a method of one embodiment of the present invention comprises providing a voltage-mode driver generating drive signals for the electrical load in response to drive commands.

The drive commands for the voltage-mode driver are filtered for obtaining compensated drive commands compensating for a phase shift between electrical quantities delivered to the electrical load, and the compensated commands are supplied to the voltage-mode driver.

Another embodiment of the present invention provides a circuit that comprises a voltage-mode driver generating drive signals for the electrical load in response to drive commands, and a drive commands generator generating the drive commands.

A compensation filter receives the drive commands and supplies the voltage-mode driver with compensated drive commands, compensating a phase shift between electrical quantities delivered to the electrical load by the voltage-mode driver.

BRIEF DESCRIPTION OF THE DRAWINGS

The features and advantages of the present invention will appear from the following detailed description of preferred embodiments thereof, provided merely by way of non-limiting examples, made in connection with the annexed drawings, wherein.

DETAILED DESCRIPTION OF THE INVENTION

Figure 1:
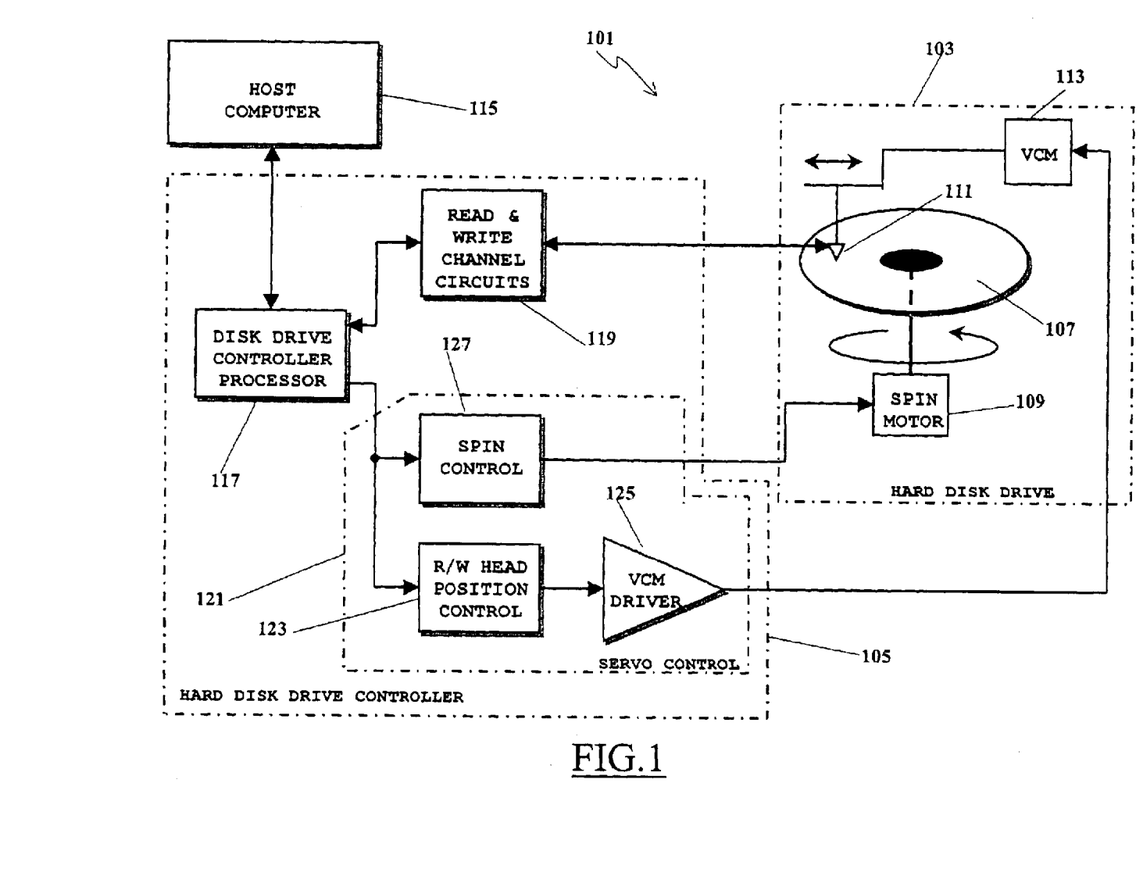
FIG. 1 is a block diagram of a hard disk drive control system in which the voltage-mode driver circuit and method according to the present invention are implemented.

Referring to the drawings, FIG. 1 schematically illustrates a hard disk drive system 101 in which the present invention is embodied. The disk drive system 101 includes a hard disk drive assembly 103 and a hard disk drive controller unit 105 controlling the hard disk drive assembly 103.

The hard disk drive assembly 103 typically includes a plurality of magnetic disks 107, a spin motor 109 for spinning the disks 107 about an axis, read/write means for transferring data to/from the disks, including a read/write head or system of heads 111 and a voice coil motor (VCM) 113 for positioning the read/write heads 111 at specific locations with respect to the disk or disks surfaces.

The hard disk drive controller unit 105 responds to a host computer 115, such as a personal computer, a server, a workstation or the like, requiring access to bulk data storage capabilities offered by the hard disk drive assembly 103. Through the hard disk controller unit 105, the host computer 115 performs specific functions on the hard disk drive assembly 103, such as reading and writing data, and obtaining state information such as defect tables, error status and the like.

The hard disk drive controller unit 105 includes a disk drive controller processor 117, communicating with the host computer 115 through an input/output circuitry (not explicitly shown in the drawings), and memory resources (RAM and ROM, also not shown in the drawing) associated with the disk drive controller processor 117. The disk drive controller processor 117 receives and processes requests and commands from the host computer 115, and generates appropriate responses thereto, including read data, state information and/or error codes, depending on the specific operation that the host computer 115 requires.

The hard disk drive controller unit 105 also includes a read and write channel electronic circuits, depicted as a single block 119, for pre-processing and amplifying data read from the magnetic disks as well as for amplifying data to be written onto the disks, and a servo control 121 generating drive signals that control the VCM 113 and the spin motor 109.

In particular, the drive signals for the VCM 113 are generated by a read/write head position control circuit 123, receiving commands from the disk drive controller processor 117, and a VCM driver circuit 125 that receives drive commands from the read/write head position control circuit 123. The VCM driver circuit 125 includes a voltage-mode driver circuit, delivering controlled voltage signals to the VCM 113. Subjected to such controlled voltage signals, the VCM 113 precisely controls the position of the read/write head or system of heads 111 With respect to the surface or surfaces of the disk or disks 107.

The drive signal for the spin motor 109 are generated by a spin control circuit 127, also receiving commands from the disk drive controller processor 117. Preferably, but not limitatively, also the spin control circuit 127 includes a voltage-mode control circuit. The spin control circuit 127 regulates the speed of the spin motor 109 in response to commands from the disk drive controller processor 117.

The host computer 115 sends write commands and write data to the hard disk drive controller unit 105 for writing the write data onto the disks 107 in the hard disk drive assembly 103; similarly, the host computer 115 sends read commands to retrieve previously written data from the disks 107. In both cases, the host computer 115 provides to the hard disk drive controller unit 105 an indication of a specific location or set of locations on the disks 107 in which or from which the data are to be written or retrieved.

The data to be written onto, or that are retrieved from the disks 107 are typically buffered in a buffer memory, accessible by the disk drive controller processor 117, and subsequently delivered to the hard disk drive assembly 103 or to the host computer 115. Buffering the data in the buffer memory allows overcoming differences between the operating speed of the host computer 115 and that of the hard disk drive assembly 103. In place of or in addition to the buffer memory, a cache memory can be used.

Through the read channel circuit, the disk drive controller processor 117 obtains data and control information stored on the disks 107. In particular, control information such as servo control data, phase lock oscillator synchronization patterns, and servo burst signals are encoded into specific portions of the disks 107. The disk drive controller processor 117 uses this information to generate appropriate commands for the spin control circuit 127 and the read/write head position control circuit 123.

Figure 2:
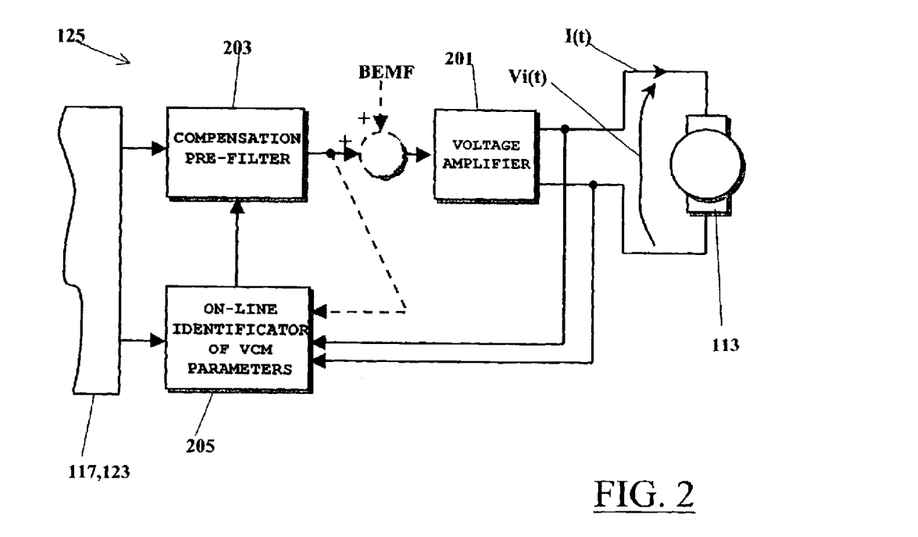
FIG. 2 shows in greater detail the voltage-mode driver circuit, in an embodiment of the present invention.

FIG. 2 shows in greater detail the VCM driver circuit 125, in an embodiment of the invention. Block 201 schematically represents a voltage amplifier, delivering the controlled voltage signals to the VCM 113.

Due to the fact that the VCM 113 is a complex impedance load for the voltage amplifier 201, and particularly an inductive load, any variation in the input voltage Vi(t) to the VCM 113 produces a variation in the VCM current I(t) that depends not only on the VCM input voltage Vi(t), but also on the resistance and inductance of the VCM windings. Additionally, the VCM current I(t) depends on the VCM back electromotive force, which is proportional to the VCM rotation speed. Adopting a simplified model of the VCM, the following transfer (admittance) function VI(s) can be derived:

$$VI(s) = \frac{sJ}{s^2 JL + sJR + K_t^2} \quad (1)$$

where s is a complex variable, R and L are the resistance and inductance of the VCM windings, J is the mechanical inertia of the VCM and $K_t$ is the VCM torque constant.

It can be seen that the admittance function VI(s) has a zero in the origin (s=0), thereby the static gain is null, and a pair of real poles (solutions of the equation $s^2 JL+sJR+K_t^2=0$). The admittance function VS(s) thus has the characteristic shape of a band-pass filter. This shape is quite different from that of the closed-loop transfer function of a conventional current-mode driver circuit, which has instead the characteristic shape of a low-pass filter with a pole at a relatively high frequency (typically, 20 KHz).

As a consequence, while in the conventional current-mode drive a variation in the voltage at the input of the closed control loop produces a proportional and in-phase variation in the VCM current (at least in the frequency range of interest), the above-reported admittance function VI(s) shows that the variation in the VCM current I(t) produced by a change in the voltage Vi(t) is attenuated and out of phase, in particular lagged (in an inductive load the current cannot change instantaneously in response to a sudden change in the applied voltage). This renders the VCM control not precise, as instead required in modern high-density hard disk drives.

In view of this problems, a compensation pre-filter 203 is inserted upstream the voltage amplifier 201. The compensation pre-filter 203 receives commands from the disk drive controller processor 117 and the read/write head position control circuit 123, and generates filtered, compensated commands for the voltage amplifier 201. The compensation pre-filter 203 is designed to have a transfer function F(s) such that $$P(s) = F(s) \cdot VI(s) = \frac{P_{gain}}{1 + s/\omega_{cut}} \quad (2)$$

where P(s) is the overall transfer (admittance) function of the compensation pre-filter 203 and the VCM 113. The one-pole transfer function P(s) has the characteristic shape of a low-pass filter, similarly to the closed-loop transfer function of the conventional current-mode drive. $P_{gain}$ is the static gain, and $\omega_{cut}$ is chosen to have a value close to the cut-off frequency of the current-mode control loop (20 KHz, typically).

The transfer function F(s) of the compensation pre-filter 203 shall thus be $$F(s) = \frac{P(s)}{VI(s)} = \frac{P_{gain}}{1+s/\omega_{cut}} \cdot \frac{s^2 JL + sJR + K_t^2}{sJ} \quad (3)$$

In this way, the voltage-mode VCM driver circuit 125 behaves as and can directly replace a conventional current-mode driver circuit, with the significant advantage of having a lower power dissipation (no resistive shunt and high-power linear amplifier needed) and requiring less silicon area.

A better pre-filter design is achieved if a finer VCM model is adopted, which is closer to the real system. Just to cite some, the non-linear, viscous friction introduced by the VCM pivot bearings and the stiffness of the flexible cable carrying the control signals to the VCM and the read/write signals to the head from the electronic circuitry, are additional aspects that can be taken into account when modelling the VCM 113. With these additional parameters, the transfer function of the VCM (as confirmed by experimental measures performed by the Applicant) results to have a non-null static gain and a resonant behavior in the low-frequency range, while a pole is present at a higher frequency, close to R/L (roll-off frequency). Experiments have shown that a compensation pre-filter designed to have the transfer function of a high-pass filter, with a zero approximately located at the roll-off frequency R/L (of the order of 10 KHz), thereby cancelling the pole at R/L in the VCM admittance function, and a pole at a very high frequency (approximately 40 KHz), has performance levels quite close to those of the conventional current-mode driver circuit.

In an embodiment of the present invention, when a value of the VCM back electromotive force (shortly, the BEMF) is available (either as a result of measurements or as a result of an estimation process), the BEMF is compensated by means of a feed-forward action, achieved by adding the BEMF measured or estimated value to the output of the compensation pre-filter 203 (as shown in phantom in FIG. 2). By introducing the BEMF compensation, the transfer function between the pre-filter output and the VCM current becomes:

$$VIFF(s) = \frac{1}{sL+R}$$

Again, a suitable pre-filter 203, capable of featuring performances equivalent to those of a current-mode control loop, shall have a zero located at R/L, and a pole located at high frequency, as described previously. Compared to the embodiment previously described, the provision of the BEMF compensation allows a more effective handling of saturations during long seeks.

Figure 3:
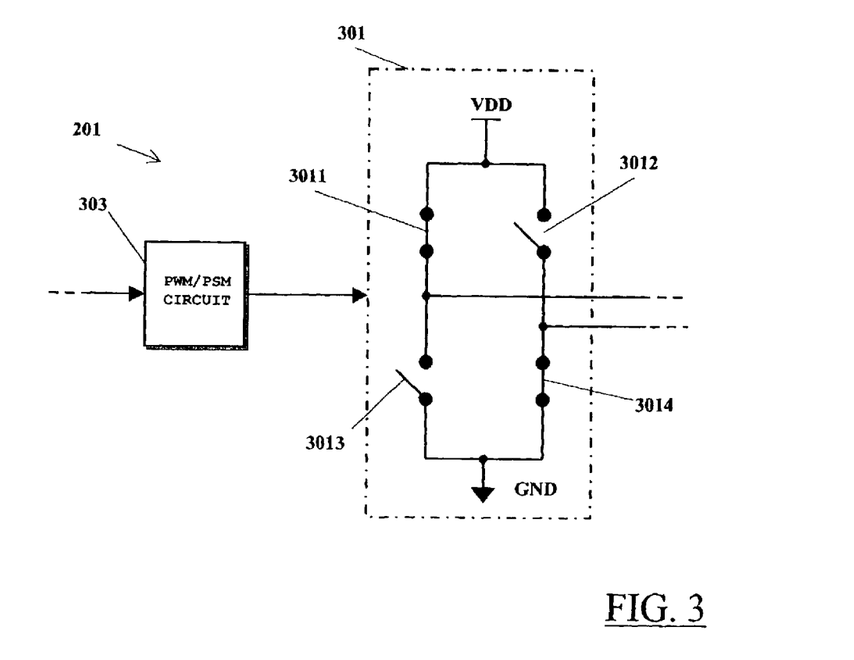
FIG. 3 shows in greater detail a voltage amplifier of the voltage-mode driver circuit, in an embodiment of the present invention.

In FIG. 3 an embodiment of the voltage amplifier 201 is shown, comprising a switched power driver circuit 301 controlled by a pulse width modulation (PWM) or, alternatively, a phase shift modulation (PSM) circuit 303 fed by the output of the compensation pre-filter 203. In the shown example, the power driver circuit 301 is configured as an "H-bridge" driver circuit; four switches 3011–3014 are provided, the on/off state of each switch being controlled by a respective signal of the signals issued by the PWM/PSM circuit 303. Switching the terminals of the VCM between a supply voltage VDD and a reference voltage GND, the power driver circuit 301 provides current to drive the VCM 113.

It is observed that the implementation of the voltage amplifier 201 by a switched-mode amplifier is not to be considered limitative; any known voltage amplifying scheme can in principle be adopted, either switched-mode or linear, albeit from a practical viewpoint some of them will result disadvantageous for efficiency considerations. In particular, a switched-mode amplifier is preferred in view of a fully digital implementation of the voltage-mode drive. In this case, it is worth observing that using a PWM power stage the voltage applied to the VCM is proportional to both the duty cycle and to the supply voltage VDD. This means that the voltage applied to the VCM may vary with the supply voltage, which may lead to an overall reduction in performance. However, this problem can be easily solved, since the supply voltage is usually measured with a certain degree of accuracy, so the actual applied voltage can be easily computed.

The compensation pre-filter 203 can be implemented in analog or digital form. The digital implementation of the compensation pre-filter is preferred in view of a fully digital implementation of the whole voltage-mode driver circuit. In this case, the sample frequency (Fc) to be used in the compensation pre-filter shall be significantly higher than the servo sampling frequency (Fs) of the disk (the frequency at which the servo control signals are received by the disk drive controller processor, given by the number of disk sectors per disk track multiplied by the number of disk revolutions per second), typically ranging from 10 to 13 KHz, since the analog equivalent compensation pre-filter operates up to a much higher frequency; adopting the same sampling frequency as the servo sampling frequency would produce unacceptable phase and gain warping near the Nyquist frequency. Experiments have demonstrated that a filter sampling frequency approximately ranging from four to eight times higher than the servo sampling frequency is suitable; this means that the pre-filter 203 produces a number ranging from four to eight commands for the voltage amplifier 201 during one servo sampling period. Synchronization between the servo sampling and the filter can be guaranteed by using a phase-locked loop, generating a number ranging from four to eight equally spaced pulses during one servo sampling period.

Figure 4:
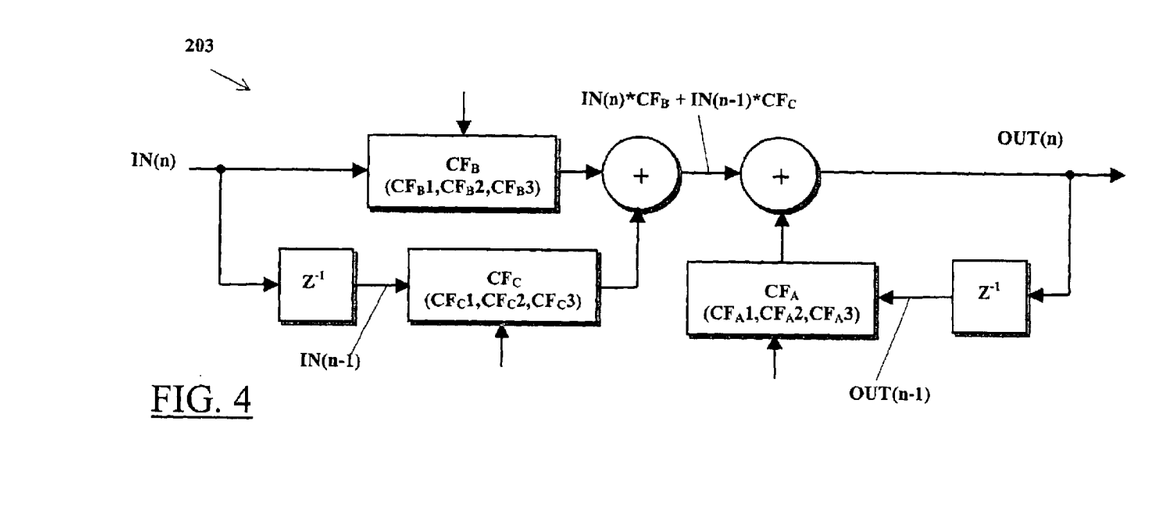
FIG. 4 shows a compensation pre-filter for the voltage-mode driver circuit, in an embodiment of the present invention.

FIG. 4 shows a possible digital implementation of the compensation pre-filter 203. A common way to design a digital filter is to calculate the Laplace transform of the analog filter analogequivalent, and then obtaining the Z transform. Coefficients $CF_A$, $CF_B$ and $CF_C$ are calculated off-line for a particular VCM, either empirically or mathematically, and are then loaded in; the coefficient values depend on the characteristics of the (admittance function of the) VCM, particularly the inductance L and the resistance R of the VCM windings. IN(n) denotes the $n^{th}$ sample of the filter input, i.e., the (sampled) command coming from the read/write head position control circuit 123, which is sampled at the filter sample rate Fs; similarly, OUT(n) denotes the $n^{th}$ sample of the filter output. The $n^{th}$ input sample IN(n), weighted by the coefficient $CF_B$, is added to the $(n-1)^{th}$ input sample IN(n-1), in turn weighted by the coefficient $CF_C$. The sum IN(n)*$CF_B$+IN(n-1)*$CF_C$ is then added to the $(n-1)^{th}$ sample of the filter output OUT(n-1), weighted by the coefficient $CF_A$.

The compensation pre-filter can be implemented in a pure software fashion, for example by the processor 117.

A compensation pre-filter such as the one described, designed to have a transfer function with a zero approximately in correspondence of the pole $R_t/L$ in the VCM admittance function, performs quite well provided that the admittance function of the VCM does not change over time. In the practice, this is not so. In particular, the value of the VCM windings resistance R varies with the VCM operating temperature; resistance variations in the range +/−20% around the nominal value have been experimentally observed. When the value of the VCM windings resistance R changes, the shape of the VCM admittance function varies, because the pole (R/L) is located at a different frequency compared to the nominal one (at the reference temperature). Another problem related to the variation of the VCM windings resistance is the change in the static gain. As a consequence, the pre-filter 203 is no more capable of operating the desired compensation, and the performance of the voltage-mode driver circuit worsens.

Experimental results have shown that if the compensation pre-filter 203 is designed assuming a nominal VCM windings resistance value which is higher than the actual one, a transfer function P(s) is obtained which is characterized by a certain degree of phase lead at high frequencies, which does not alter dramatically the voltage-mode drive performance. On the contrary, designing the filter on a nominal VCM windings resistance value lower than the actual one causes a high-frequency roll-off that unacceptably degrades the voltage-mode drive performance.

The above-discussed results have suggested to the Applicant that it is preferable to design the pre-filter assuming a VCM windings resistance value higher than the actual one at ambient temperature, because the temperature, and thus the windings resistance, will normally be higher when the VCM is operating.

In a preferred embodiment of the present invention, an adaptive compensation pre-filter 203 is used, and an on-line identification procedure of the VCM characteristic parameters that are more critical to the compensation pre-filter performance is adopted, for allowing the pre-filter tracking variation in such parameters. This is schematically depicted in FIG. 2, wherein a block 205 denotes a unit implementing the procedure for the on-line identification of the VCM characteristic parameters. The unit 205 monitors the controlled voltage signals delivered to the VCM 113, and receives from the disk drive controller processor 117 information on the read/write heads position, which in turn the processor 117 derives from the read channel 119. The unit 205 then acts on the compensation pre-filter 203, controlling it so as to adapt the pre-filter 203 to the current VCM characteristic parameters. In the exemplary pre-filter embodiment shown in FIG. 4, the coefficients $CF_A$, $CF_B$, $CF_C$ are changed, so as to change the frequency of the zero introduced by the compensation pre-filter 203; for example, for each coefficient $CF_A$, $CFR_B$, $CF_C$ a respective set of values $(CF_A1, CF_A2, CF_A3, \ldots), (CF_B1, CF_B2, CF_B3, \ldots)$ and $(CF_C1, CF_C2, CF_C3, \ldots)$ is defined, and the coefficient value is chosen within the predefined set of values according to the instructions of received from the unit 205. It is observed that, from a practical viewpoint, the monitoring of the controlled voltage signals Vi(t) delivered to the VCM 113 that is performed by the on-line identification unit 205 is made indirectly, deriving the voltage signals Vi(t) from the output of the compensation pre-filter 203 (as shown in phantom in FIG. 2).

In particular, the Applicant has observed that the VCM parameter that is more affected by variations due to changes in the operating conditions such as temperature is the VCM windings resistance R; other parameters such as the moment of inertia J, the torque constant $K_t$ and the inductance L are instead scarcely affected by changes in operating conditions, and can thus be considered constant.

This observation allows simplifying the on-line estimation procedure of the VCM characteristic parameters; in particular, it is unnecessary to try and estimate the whole VCM transfer (admittance) function, being sufficient to estimate the variations of those parameters that are more affected by operating condition changes, e.g., the windings resistance R.

According to an embodiment of the invention, the procedure for the on-line estimation of the VCM windings resistance R is implemented by means of a Kalman filter, particularly (due to the non-linear nature of the system) an extended Kalman filter (EKF).

The EKF is an optimal least-square estimator algorithm, suitable for estimating the states of dynamic non-linear systems. In few words, the EKF provides for linearizing the non-linear system to be estimated around a current working point, and then applies the Kalman filtering technique to the linearized system thus obtained.

Figure 5:
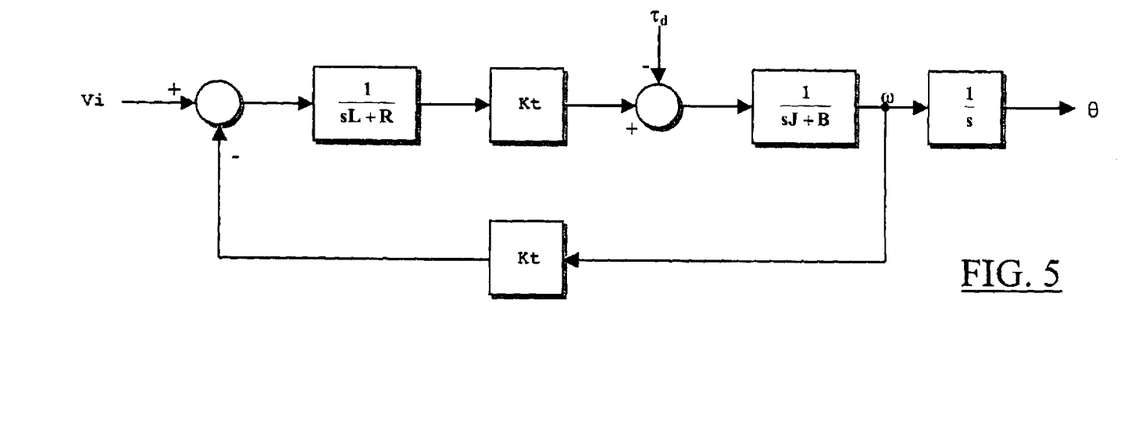
FIG. 5 is a schematic block diagram showing a dynamic system model adopted for implementing an on-line estimation process of system characteristic parameters, in a preferred embodiment of the present invention.

In FIG. 5 there is shown a schematic block diagram describing the system model used for developing the EKF for the on-line estimation of the VCR windings resistance. In this drawing, Vi identifies the voltage applied to the VCM; θ is the angular position of VCM rotor; ω is the angular speed of the VCM rotor; $\tau_d$ is a disturbance torque acting on the VCM. As in equation (1) reported above, R and L identify the VCM windings resistance and inductance, J identifies the moment of inertia of the VCM, Kt is the torque constant of the VCM.

Taking into account that the windings resistance R is not constant, but (slowly) varying in time, the equations governing the dynamics of the (non-linear) system are the following:

$$\dot{\theta}(t) = \omega(t) + w_1(t)$$

$$\dot{\omega}(t) = -\frac{B}{J} \cdot \omega(t) + \frac{K_t}{J} \cdot i(t) + \tilde{w}_2(t)$$

$$\dot{i}(t) = -\frac{K_t}{L} \cdot \omega(t) - \frac{R(t)}{L} \cdot i(t) + \frac{1}{L} \cdot v_i(t) + w_3(t)$$

$$\dot{R}(t) = w_R(t)$$

$$y(t) = \theta(t) + \eta(t)$$

wherein i(t) is the input current to the VCM, y(t) is the system output, i.e., the result of the measurement conducted on the system, in the present case the angular position θ(t) of VCM rotor, added to a zero-mean white Gaussian noise term η(t) representative of the system measurement noise. In these equations, $w_1(t)$, $w_2(t)$, $w_3(t)$ and $w_R(t)$ identifies zero-mean white Gaussian noise terms representative of the process or model noise; it is observed that in this way the variability in time of the windings resistance R has been modelled by a stochastic model referred to as "random walk". The model noise term $\tilde{w}_2(t)$ in the second equation, which is normally considered zero-mean, white and Gaussian, is representative of the torque disturbance acting on the system. The torque disturbance is mainly due to the presence of a magnet for parking the head, and to the electrical connections (typically a flat cable) necessary for the exchange of data to/from the head. For these reasons, the noise term $\tilde{w}_2(t)$ cannot be considered white and Gaussian, and is instead:

$$\tilde{w}_2(t) = \frac{1}{J}\tau_d(t) + w_2(t)$$

wherein the term $w_2(t)$ is a white Gaussian noise term, and the torque disturbance $\tau_d(t)$ is modelled by a random walk:

$$\dot{\tau}_d = w_{\tau d}$$

Based on this considerations, the number of states of the system model is increased by one, and the full set of equations governing the system dynamics becomes:

$$\dot{\theta}(t) = \omega(t) + w_1(t)$$
$$\dot{\omega}(t) = -\frac{B}{J}\cdot\omega(t) + \frac{K_t}{J}\cdot i(t) - \frac{1}{J}\cdot\tau_d(t) + w_2(t)$$
$$\dot{i}(t) = -\frac{K_t}{L}\cdot\omega(t) - \frac{R(t)}{L}\cdot i(t) + \frac{1}{L}\cdot v_i(t) + w_3(t)$$
$$\dot{R}(t) = w_R(t)$$
$$\dot{\tau}_d(t) = w_{\tau_d}(t)$$
$$y(t) = \theta(t) + \eta(t)$$

It can be appreciated that both the windings resistance R and the disturbance torque $\tau_d(t)$ are taken as state variables, together with the angular position $\theta$ and the angular speed $\omega$ of the VCM rotor, and the VCM input current $i(t)$.

These equations can be re-written in the following matrix form:

$$\begin{bmatrix}\dot{\theta}\\\dot{\omega}\\\dot{i}\\\dot{R}\\\dot{\tau}_d\end{bmatrix} = \begin{bmatrix}\dot{x}_1\\\dot{x}_2\\\dot{x}_3\\\dot{x}_4\\\dot{x}_5\end{bmatrix} = \begin{bmatrix}x_2\\\frac{1}{J}(K_t x_3 - x_5) - \frac{B}{J}x_2\\-K_t x_2 \frac{1}{L} - \frac{x_4 x_3}{L}\\0\\0\end{bmatrix} + \begin{bmatrix}0\\0\\\frac{1}{L}\\0\\0\end{bmatrix}v_i + \begin{bmatrix}w_1\\w_2\\w_3\\w_R\\w_{\tau d}\end{bmatrix} = \quad(7)$$

$$= f(X(t), vi(t)) + W(t)$$

$$y = h(X(t)) + \eta(t) = x_1 + \eta(t)$$

wherein $X(t)$ is the vector of state variables:

$$\begin{bmatrix}\theta\\\omega\\i\\R\\\tau_d\end{bmatrix} = \begin{bmatrix}x_1\\x_2\\x_3\\x_4\\x_5\end{bmatrix} = X(t)$$

and $W(t)$ is a vector representative of the white Gaussian model noises, uncorrelated with respect to the measurement noise $\eta(t)$.

The process or model noise covariance $Q(t)$ and the measurement noise covariance $R_\eta(t)$ are defined as:

$$Q(t) \triangleq E[w(t)\cdot w(t)'] R_\eta(t) \triangleq E[\eta(t)\cdot\eta(t)']$$

The system of equations reported in (7) is clearly nonlinear. In order to perform an on-line estimation, a linearization of the system around a working point $\hat{x}$ in the space of state variables. To this purpose, the following Jacobian matrices are defined:

$$F_{\hat{x}} \triangleq \frac{\partial f}{\partial x}\bigg|_{x=\hat{x}} = \begin{bmatrix}0 & 1 & 0 & 0 & 0\\0 & -\frac{B}{J} & \frac{K_t}{J} & 0 & -\frac{1}{J}\\0 & -\frac{K_t}{L} & -\frac{\hat{x}_4}{L} & -\frac{\hat{x}_3}{L} & 0\\0 & 0 & 0 & 0 & 0\\0 & 0 & 0 & 0 & 0\end{bmatrix} \quad(8)$$

$$G_{\hat{x}} \triangleq \frac{\partial f}{\partial v}\bigg|_{x=\hat{x}} = \begin{bmatrix}0\\0\\\frac{1}{L}\\0\\0\end{bmatrix}$$

$$H_{\hat{x}} \triangleq \frac{\partial h}{\partial x}\bigg|_{x=\hat{x}} = [1\ 0\ 0\ 0\ 0]$$

Thus, around the working point $\hat{x}$ the system can be described by the following equations:

$$\delta\dot{x}(t) = F_{\hat{x}}(x(t))\delta x(t) + G_{\hat{x}} vi + w(t)$$
$$y(t) = H_{\hat{x}} x(t) + \eta(t) \quad(9)$$

The system defined in (9) is then discretized, in order to implement a discrete version of the state estimator; for example, the discretization is performed at servo sampling frequency of the disk; alternatively, the discretization is performed at a rate which is a multiple or a submultiple of the servo sampling frequency. The equation describing the discretized system becomes:

$$\delta x(t_k) = \Phi(t_k, t_{k-}, x(t_{k-1}))\delta x(t_{k-1}) + v(t_{k-1})$$

where $\Phi$ is the exponential or fundamental matrix for the system (9):

$$\Phi_k \triangleq e^{F_{\hat{x}(k|k)}T} \approx I + F_{\hat{x}(k|k)}T$$

$\Phi$ represents the model covariance, discretized at the $k^{th}$ step. The discrete system noise $v$ is related to the time-continuous system noise by the following equation:

$$v(t_k) = \int_{t_t}^{t_{k+1}} \Phi(t_{k+1}, s, x(s))\sigma(s)ds \quad(11)$$

The corresponding covariance matrix, used in the EKF design, is then:

$$Q_d(t_k) = \int_{t_t}^{t_{k+1}} \Phi(t_{k+1}, s, x(s))Q(s)\Phi(t_{k+1}, s, x(s))'ds \quad(12)$$

If it is assumed that Q is time-invariant, it follows that:

$$Q(k) = \int_0^T e^{F_{\hat{x}(k|k)}(T-\sigma)} \cdot Q \cdot e^{F_{\hat{x}(k|k)}(T-\sigma)} d\sigma$$

$$\approx \int_0^T [I + F_{\hat{x}(k|k)}(T-\sigma)] \cdot Q \cdot [I + F_{\hat{x}(k|k)}(T-\sigma)]' d\sigma$$

$$= QT + \frac{1}{2}\cdot[Q\cdot F'_{\hat{x}(k|k)} + F_{\hat{x}(k|k)}\cdot Q]T^2 + \frac{1}{3}\cdot F_{\hat{x}(k|k)}\cdot Q\cdot F'_{\hat{x}(k|k)}T^3$$

Once the linearized and discretized version of the system (7) is obtained, the EKF for the system can be derived following known techniques.

For a given sampling time $t_k$, both the optimal estimate $x_{k+1|k+1}$ and the covariance matrix thereof $P_{k+1|k+1}$ are generated by the EKF through a two-step recursive loop.

The first step (prediction and calculation of the a priori covariance) performs a prediction of both quantities, based on the previous estimates $x_{k|k}$ and the deterministic input vi(k). In an embodiment of the invention, a simple rectangular integration technique is used, so that the prediction step results in the following recursive equations:

$$x_{k+1|k} = x_{k|k} + \lfloor f(x_{k|k}) + Bu(k) \rfloor T$$

$$P_{k+1|k} = P_{k|k} + (F_k P_{k|k} + P_{k|k} F_k') T + Q_d \quad (13)$$

with $F_k$ defined as in (8) and computed for $x = x_{k|k}$. T is the sampling period Tc of the pre-filter 203, N times shorter than the servo sampling period Ts. It is worth noting that only the VCM input is actually updated at Tc, while the position signal is read at the servo sampling rate Ts. In order to provide the EKF with inter-sample values, the missing samples of the position signal are obtained by interpolation, using a first-order holder at Ts, followed by a sampler at Tc.

The second step (innovation step) corrects the predicted state estimation and its covariance matrix through a feedback correction scheme that makes use of the actual measured quantities (i.e., VCM rotor angular position). This is realized by the following recursive relations:

$$x_{k+1|k+1} = x_{k+1|k} + L_{k+1}(y(k+1) - Hx_{k+1|k})$$

$$P_{k+1|k+1} = P_{k+1|k} - L_k H P_{k+1|k} \quad (14)$$

where the Kalman filter gain matrix $L_k$ is defined by:

$$L_k = P_{k+1|k} H'(H P_{k+1|k} H' + R)^{-1} \quad (15)$$

This procedure for the on-line estimation of the VCM windings resistance $R_t$, using an EKF that is based on a complete, five-state, or fifth order, model of the system, of the VCM, has a relatively high computational complexity.

The high computation complexity derives in particular from the complexity of the calculation for obtaining the prediction variance matrix and the filtering matrix. In fact, for calculating the prediction of the covariance matrix the following formula is used:

$$P(k+1|k)_{(i,j)} = \sum_{t=1}^{5} \left[ \sum_{k=1}^{5} \Phi_{k(i,k)} P(k|k)_{(k,t)} \right] \Phi_{k(j,t)} + Q_{(i,j)}$$

It can be shown that seventy-five variables, 180 products, 120 additions and one division are involved in the computation.

In the following, alternative embodiments of the on-line estimation procedure are described which have a lower computation complexity, and are therefore more suitable from a practical implementation viewpoint.

According to a first alternative embodiment, the on-line estimation procedure is based on a simplified, reduced-order system model, described by only four state variables instead of five. Specifically, in this four-state, or fourth order, system model the inputs to the EKF are the voltage applied to the VCM windings and the read/write head angular speed ω (instead of the read/write head angular position θ, as in the previous case).

Under the above assumption, the equations describing the system dynamics become:

$$\omega(t) = \frac{K_t}{J} \cdot i(t) - \frac{1}{J} \cdot \tau_d(t)$$

$$i(t) = -\frac{K_t}{L} \cdot \omega(t) - \frac{R(t)}{L} \cdot i(t) + \frac{1}{L} \cdot v_i(t)$$

$$R(t) = 0$$

$$\tau_d(t) = 0$$

$$y(t) = \omega(t)$$

The state variable vector X is thus:

$$x = \begin{bmatrix} x_1 \\ x_2 \\ x_3 \\ x_4 \end{bmatrix} \triangleq \begin{bmatrix} \omega \\ i \\ R \\ \tau_d \end{bmatrix}$$

The read/write head angular speed ω can be measured (and in this case it is supplied to the estimation unit 205 by the disk drive controller processor 117) or it can derived starting from the measurement of the head position. For example, the head angular speed ω(k) is derived from three samples of the measured head position p(k−1), p(k) and p(k+1) by calculating an average position p0:

$$p_0 = \tfrac{1}{3}[p(k-1) + p(k) + p(k+1)]$$

calculating intermediate speed values:

$$v_{-1} = 1/T \cdot [p_0 - p(k-1)]$$

$$v_{+1} = 1/T \cdot [p(k+1) - p_0]$$

and then deriving the angular speed as:

$$\omega(k) = \tfrac{1}{2} \cdot [v_{-1} + v_{+1}]$$

The formula for updating the angular speed value at the k-th step is thus:

$$\omega(k) = \frac{p(k+1) - p(k-1)}{2T}$$

It is observed that other methods exist for deriving the head angular speed by interpolating the read/write head position measures between two time instants, such as the linear interpolation, the zero-order holder and the first-order holder.

It is observed that the head angular speed can be fed to the EKF at a rate which is a multiple, a submultiple or is equal to the servo sampling frequency.

Adopting the above-mentioned four-state system model, the following procedure is followed for estimating the windings resistance R.

Prediction $$x_1(k+1|k) = x_1(k|k) + x_2(k|k) \cdot T(K_t/J) - x_4(k|k) \cdot T/J$$

$$x_2(k+1|k) = x_2(k|k) - x_1(k|k) \cdot TK_t/L - x_2(k|k) x_3(k|k) \cdot T/L + v_1(k) \cdot T/L$$

$$x_3(k+1|k) = x_3(k|k)$$

$$x_4(k+1|k) = x_4(k|k)$$

Calculation of the a Priori Covariance

The formula for calculating the a priori covariance $P(k+1|k)$ is:

$$P(k+1|k) = \Phi_k \cdot P(k|k) \cdot \Phi'_k + Q$$

and can be rewritten in the following vector form:

$$\overline{P}(k+1|k) = A(k+1) \cdot \overline{P}(k|k) + \overline{Q}$$

where $A(k+1)$ is a time-varying matrix of dimension 10×10, that depends on the fundamental matrix:

$$\Phi_k = \begin{bmatrix} 1 & T(K_t/J) & 0 & -T/J \\ -TK_t/L & (1 - x_4(k|k)T/L) & -x_3(k|K)T/L & 0 \\ 0 & 0 & 1 & 0 \\ 0 & 0 & 0 & 1 \end{bmatrix}$$

Innovation

Since the matrix $H = [1\,0\,0\,0]$ has only one element different from zero, the following equations are obtained:

$$\Lambda(k+1) = P_{p(1,1)} + R_\eta$$

$$L(k+1) \triangleq \begin{bmatrix} L_1 \\ L_2 \\ L_3 \\ L_4 \end{bmatrix} = \begin{bmatrix} P_{p(1,1)} \\ P_{p(1,2)} \\ P_{p(1,3)} \\ P_{p(1,4)} \end{bmatrix} \cdot \frac{1}{\Lambda(k+1)}$$

$$\varepsilon(k+1) = x_1(k+1|k) - y(k+1)$$

$$x_1(k+1|k+1) = x_1(k+1|k) + L_1 \cdot \varepsilon(k+1)$$

$$x_2(k+1|k+1) = x_2(k+1|k) + L_2 \cdot \varepsilon(k+1)$$

$$x_3(k+1|k+1) = x_3(k+1|k) + L_3 \cdot \varepsilon(k+1)$$

$$x_4(k+1|k+1) = x_4(k+1|k) + L_4 \cdot \varepsilon(k+1)$$

Calculation of the a Posteriori Covariance

It can be shown that both the a priori and the a posteriori covariance matrices have many null elements, and the computational effort can be largely reduced by computing only the non-zero elements at each time step. For instance, the formula for calculating the non-zero terms of the a posteriori covariance $P(k+1|k+1)$ is the following:

$$\overline{P}(k+1|k+1) = \begin{bmatrix} (1-L_1)^2 \cdot P_{p(1,1)} - \\ (1-L_1)L_2 \cdot P_{p(1,1)} + (1-L_1) \cdot P_{p(1,2)} \\ L_2^2 \cdot P_{p(1,1)} - 2L_2 \cdot P_{p(1,2)} + P_{p(2,2)} - \\ (1-L_1)L_3 \cdot P_{p(1,1)} + (1-L_1) \cdot P_{p(1,3)} \\ L_3 L_2 \cdot P_{p(1,1)} - L_3 \cdot P_{p(1,2)} - L_2 \cdot P_{p(1,3)} P_{p(2,3)} \\ L_3^2 \cdot P_{p(1,1)} - 2L_3 \cdot P_{p(1,3)} + P_{p(3,3)} - \\ (1-L_1)L_4 \cdot P_{p(1,1)} + (1-L_1) \cdot P_{p(1,4)} \\ L_2 L_4 \cdot P_{p(1,1)} - L_4 \cdot P_{p(1,2)} - L_2 \cdot P_{p(1,4)} P_{p(2,4)} \\ L_3 L_4 \cdot P_{p(1,1)} - L_4 \cdot P_{p(1,3)} - L_3 \cdot P_{p(1,4)} P_{p(3,4)} \\ L_4^2 \cdot P_{p(1,1)} - 2L_4 \cdot P_{p(1,4)} + P_{p(4,4)} \end{bmatrix} + \begin{bmatrix} L_1^2 \\ L_1 L_2 \\ L_2^2 \\ L_1 L_3 \\ L_2 L_3 \\ L_3^2 \\ L_1 L_4 \\ L_2 L_4 \\ L_3 L_4 \\ L_4^2 \end{bmatrix} \cdot R_\eta$$

It can be shown that, adopting this simplified, reduced-order system model, the number of variables is reduced to 54, the number of multiplications falls to 120, the number of additions is reduced to 88, while the number of divisions is still equal to one.

According to a second alternative embodiment, the computation complexity of the on-line estimation process of the VCM windings resistance is further reduced if the disturbance torque $\tau_d(t)$ is neglected. The equations describing the system dynamics become in this case:

$$\omega(t) = \frac{K_t}{J} \cdot i(t)$$

$$\dot{i}(t) = -\frac{K_t}{L} \cdot \omega(t) - \frac{R(t)}{L} \cdot i(t) + \frac{1}{L} \cdot v_i(t)$$

$$\dot{R}(t) = 0$$

$$y(t) = \omega(t)$$

Thus, a three-state, or third-order system model is obtained.

This model does not however take into account the effects of the input disturbance acting on the VCM, constituted by the sum of windage, flex torque, etc. An expected side-effect of not taking into account these effects is a biased innovation in the EKF: the average value of the innovation might have a non-zero value. This would cause a poor estimate of the windings resistance R.

According to an embodiment of the present invention, in order to avoid the above-mentioned side-effect, i.e., in order to guarantee that the average value of the innovation is zero, the disturbance torque $\tau_d(t)$ is assumed to be an (unknown) input to the system (and not a state variable as in the previous embodiments, otherwise the four-state system model would be re-obtained). The first equation in the above system thus becomes:

$$\omega(t) = \frac{K_t}{J} \cdot i(t) - \frac{1}{J} \cdot \tau_d(t)$$

Albeit the value of the disturbance torque $\tau_d(t)$ is unknown, it can be estimated by considering the fact that the disturbance torque $\tau_d(t)$ introduces a bias in the EKF innovation value. In fact, if the disturbance torque $\tau_d(t)$ is set at the correct value, the innovation $\epsilon(t)$ has a zero average value. Thus, the value of the disturbance torque $\tau_d(t)$ can be derived by the following equation:

$$\tau_d(t) = K_i \cdot \int_0^t \varepsilon(t) dt$$

wherein $K_i$ is a parameter chosen to have a suitable value.

In other words, the disturbance torque $\tau_d(t)$ is put in relation with the innovation $\epsilon(t)$ by an integrator (a new feedback loop has been introduced in the filter).

Under these assumptions, the procedure for estimating the windings resistance R is the following Prediction $$x_1(k+1|k) = x_1(k|k) + x_2(k|k) \cdot T(K_t/J) - \tau_d(k) \cdot T/J$$

$$x_2(k+1|k) = x_2(k|k) - x_1(k|k) \cdot TK_t/L - x_2(k|k) x_3(k|k) \cdot T/L + v_1(k) \cdot T/L$$

$$x_3(k+1|k) = x_3(k|k)$$

Calculation of the a Priori Covariance

The formula for calculating the a priori covariance $P(k+1|k)$ can again be written in the following vector form:

$$\overline{P}(k+1|k) = A(k+1) \cdot \overline{P}(k|k) + \overline{Q}$$

where in this case the time-varying matrix $A(k+1)$ is composed of 36 elements, 20 of which are different from zero and, among these, 11 are time-varying.

Innovation

The equations are the following:

$$\Lambda(k+1) = P_{p(1,1)} + R_\eta$$

$$L(k+1) \triangleq \begin{bmatrix} L_1 \\ L_2 \\ L_3 \end{bmatrix} = \begin{bmatrix} P_{p(1,1)} \\ P_{p(1,2)} \\ P_{p(1,3)} \end{bmatrix} \cdot \frac{1}{\Lambda(k+1)}$$

$$\varepsilon(k+1) = x_1(k+1|k) - y(k+1)$$

$$x_1(k+1|k+1) = x_1(k+1|k) + L_1 \cdot \varepsilon(k+1)$$

$$x_2(k+1|k+1) = x_2(k+1|k) + L_2 \cdot \varepsilon(k+1)$$

$$x_3(k+1|k+1) = x_3(k+1|k) + L_3 \cdot \varepsilon(k+1)$$

$$\tau_d(k+1) = \tau_d(k) + K_i \cdot \varepsilon(k+1) \cdot T$$

Calculation of the a Posteriori Covariance

Again, as in the previously-described fourth-order model, both the a priori and the a posteriori covariance matrices have many null elements, and the computational effort can be largely reduced by computing only the non-zero elements at each time step. For instance, the formula for calculating the non-zero terms of the a posteriori covariance P(k+1|k+1) is the following:

$$\overline{P}(k+1|k+1) = \begin{bmatrix} (1-L_1)^2 \cdot P_{p(1,1)} - \\ (1-L_1)L_2 \cdot P_{p(1,1)} + (1-L_1) \cdot P_{p(1,2)} \\ L_2^2 \cdot P_{p(1,1)} - 2L_2 \cdot P_{p(1,2)} + P_{p(2,2)} - \\ (1-L_1)L_3 \cdot P_{p(1,1)} + (1-L_1) \cdot P_{p(1,3)} \\ L_3 L_2 \cdot P_{p(1,1)} - L_3 \cdot P_{p(1,2)} - L_2 \cdot P_{p(1,3)} P_{p(2,3)} \\ L_3^2 \cdot P_{p(1,1)} - 2L_3 \cdot P_{p(1,3)} + P_{p(3,3)} \end{bmatrix} + \begin{bmatrix} L_1^2 \\ L_1 L_2 \\ L_2^2 \\ L_1 L_3 \\ L_2 L_3 \\ L_3^2 \end{bmatrix} \cdot R_\eta$$

It can be shown that, by adopting this further simplified system model, the number of variables is reduced to 40, the number of multiplications falls to 80, the number of additions is reduced to 50. This makes the practical implementation of the on-line estimation easier.

In particular, in order to perform the calculations necessary for the on-line estimation of the VCM windings resistance R, the unit 205 includes for example a digital signal processor (DSP), particularly a floating-point DSP or, preferably, a fixed-point DSP. In particular, experiments conducted by the Applicant have shown that when the reduced-order VCM model is adopted, a computation time of about 30 $\mu$m is necessary using a standard, 25 MHz fixed-point DSP.

Experimental tests conducted by the Applicant have shown that the winding resistance estimation process converges towards the actual resistance value in times of the order of 100 ms, and has a relatively high sensitivity, being capable of detecting resistance variations of the order of 1 Ohm.

Other types of on-line estimations of the VCM characteristic parameters can be adopted, such as RLS (Recursive Least-Squares) estimation procedures of the VCM transfer function.

Preferably, the on-line estimation procedure of the characteristic parameters of the VCM is non-invasive, as the one described in detail by way of example, not to interfere with the VCM operation.

Although the detailed description provided in the foregoing referred to a voltage-mode drive of a disk drive VCM, this shall not be construed as a limitation: the invention can in fact be applied to the control of motors or inductive loads in general, and even more generally it can be applied when voltage-mode drive of complex impedance loads is desired.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of driving an electrical load having a complex electrical impedance, comprising:

providing a voltage-mode driver generating drive signals for the electrical load in response to drive commands;

filtering the drive commands for the voltage-mode driver for obtaining compensated drive commands compensating for a phase shift between electrical quantities delivered to the electrical load;

supplying the compensated drive commands to the voltage-mode driver; and estimating characteristic parameters of the electrical load during operation of the electrical load, wherein the compensated drive commands are based in part on the estimating step.

2. The method according to claim 1, in which said filtering comprises approximating a closed-loop current-mode drive.

3. The method according to claim 2, in which said filtering comprises inserting a zero in correspondence of a pole of a transfer function of the electrical load.

4. The method according to claim 3, in which said generating drive signals for the electrical load comprises generating a pulse width modulated output or a phase shift modulated output, with a duty cycle determined by the compensated commands.

5. The method according to claim 1, further comprising adapting said filtering to the estimated characteristic parameters.

6. The method according to claim 5, in which said adapting the filtering comprises modifying filtering parameters for tracking the phase shift between electrical quantities delivered to the electrical load.

7. The method according to claim 1, in which said estimating comprises performing a Kalman filtering, particularly an extended Kalman filtering.

8. The method according to claim 7, in which said Kalman filtering is based on a fifth-order model of the electrical load, said fifth-order model including as state variables an angular position and an angular speed of the read/write head, a current sunk by the voice-coil motor, a windings resistance of the voice-coil motor and a disturbance torque acting on the voice-coil motor, and is performed for estimating the windings resistance of the voice coil motor.

9. The method according to claim 7, in which said Kalman filtering is based on a fourth-order model of the electrical load, said fourth-order model including as state variables an angular speed of the read/write head, a current sunk by the voice-coil motor, a windings resistance of the voice-coil motor and a disturbance torque acting on the voice-coil motor.

10. The method according to claim 9, in which a value of the angular speed is either measured or derived by calculation from a measure of the read/write head position.

11. The method according to claim 7, in which said performing a Kalman filtering includes providing a sampled angular speed at a sample frequency which is a multiple, a sub-multiple or is equal to a sample frequency of a read/write head position servo-control.

12. The method according to claim 7, in which said performing a Kalman filtering includes receiving an input equal to or derived from an output from said filtering, at a rate that is a multiple, a sub-multiple or is equal to a sample frequency of a read/write head position servo-control.

13. The method according to claim 7, in which the electrical load is an actuator of a disk drive system, particularly a voice-coil motor controlling the position of a read/write head, and said Kalman filtering is based on a third-order model of the electrical load, said third-order model including as state variables an angular speed of the read/write head, a current sunk by the voice-coil motor and a windings resistance of the voice-coil motor, and is performed for estimating a windings resistance of the voice-coil motor.

14. The method according to claim 13, in which said performing the Kalman filtering includes receiving as an input a disturbance torque acting on the voice-coil motor.

15. The method according to claim 14, in which said performing a Kalman filtering includes establishing a relationship between the disturbance torque and an innovation value by means of an integrator.

16. The method according to claim 13, in which a value of the angular speed is either measured or derived by calculation from a measure of the read/write head position.

17. The method according to claim 13, in which said performing Kalman filtering includes providing a sampled angular speed at a sample frequency which is a multiple, a sub-multiple or is equal to a sample frequency of a read/write head position servo-control.

18. The method according to claim 13, in which said performing a Kalman filtering includes receiving an input equal to or derived from an output from said filtering, at a rate that is a multiple, a sub-multiple or is equal to a sample frequency of a read/write head position servo-control.

19. The method according to claim 1, in which the electrical load is an actuator of a disk drive system, particularly a voice-coil motor controlling the position of a read/write head.

20. The method according to claim 19, further comprising compensating a back electro-motive force of the voice-coil motor by means of a feed-forward technique.

21. A driver circuit for driving a complex electrical impedance load, comprising:
   a voltage-mode driver generating drive signals for the load in response to drive commands;
   a drive commands generator generating the drive commands;
   a compensation filter receiving the drive commands and supplying the voltage-mode driver with compensated drive commands, the compensation filter compensating for a phase shift between electrical quantities delivered to the load by the voltage-mode driver; and
   estimator means for estimating characteristic parameters of the load during the operation.

22. The driver circuit according to claim 21, in which the compensation filter has a transfer function such that the driver circuit approximates a closed-loop current-mode drive.

23. The driver circuit according to claim 21, in which the compensation filter is an analog filter.

24. The driver circuit according to claim 21, in which the compensation filter is a digital filter.

25. The driver circuit according to claim 21, in which the voltage-mode driver is a pulse width modulator or a phase shift modulator, modulating a duty cycle according to the compensated commands.

26. The driver circuit according to claim 21, in which the estimator means control the compensation filter for adapting the compensation filter to the estimated characteristic parameters, for tracking the phase shift between electrical quantities delivered to the load.

27. The driver circuit according to claim 26, in which said estimator means comprise a Kalman filter, particularly an extended Kalman filter.

28. A storage disk drive system, comprising:
   a data storage disk;
   a read/write head for reading/writing data from/into the data storage disk;
   a motor for controlling a position of the read/write head; and
   a driver circuit for driving the motor, the driver circuit including:
   a voltage-mode driver generating drive signals for the electrical load in response to drive commands;
   a drive commands generator generating the drive commands;
   a compensation filter receiving the drive commands and supplying the voltage-mode driver with compensated drive commands, the compensation filter compensating for a phase shift between electrical quantities delivered to the motor by the voltage-mode driver; and
   estimator means for estimating characteristic parameters of the motor during the operation.

29. The storage disk drive system according to claim 28, in which the compensation filter has a transfer function such that the driver circuit approximates a closed-loop current-mode drive.

30. The storage disk drive system according to claim 29, in which the compensation filter is an analog filter.

31. The storage disk drive system according to claim 29, in which the compensation filter is a digital filter.

32. The storage disk drive system to claim 28, in which the voltage-mode driver is a pulse width modulator or a phase shift modulator, modulating a duty cycle according to the compensated commands.

33. The storage disk drive system according to claim 28, in which the estimator means control the compensation filter for adapting the compensation filter to the estimated characteristic parameters, for tracking the phase shift between electrical quantities delivered to the motor.

34. The driver circuit according to claim 33, in which said estimator means comprise a Kalman filter, particularly an extended Kalman filter.

* * * * *